US007251539B2

(12) United States Patent
Nishimoto et al.

(10) Patent No.: US 7,251,539 B2
(45) Date of Patent: Jul. 31, 2007

(54) PARTS PROCUREMENT SYSTEM AND METHOD

(75) Inventors: Katsutoshi Nishimoto, Toyota (JP); Nampachi Hayashi, Aichi-gun (JP); Shinsaku Hinago, Kariya (JP); Tatsuya Okamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 384 days.

(21) Appl. No.: 09/902,667

(22) Filed: Jul. 12, 2001

(65) Prior Publication Data

US 2002/0065692 A1 May 30, 2002

(30) Foreign Application Priority Data

Jul. 21, 2000 (JP) ...................................... 2000-220579

(51) Int. Cl.
*G06F 19/00* (2006.01)

(52) U.S. Cl. ....................................... 700/101; 700/106

(58) Field of Classification Search .................. 700/95, 700/97, 106–107, 115, 100, 101
See application file for complete search history.

(56) References Cited

U.S. PATENT DOCUMENTS 5,204,821 A 4/1993 Inui et al.
6,141,598 A 10/2000 Nam ........................... 700/95
6,615,094 B2 * 9/2003 Gleis .......................... 700/108
6,684,119 B2 * 1/2004 Burnard et al. ............ 700/106
6,801,820 B1 * 10/2004 Lilly et al. .................. 700/100
2003/0109950 A1 * 6/2003 Andrade et al. ............ 700/103

FOREIGN PATENT DOCUMENTS

JP A-07-271864 10/1985
JP A 02-038193 2/1990
JP A 04-244358 9/1992
JP A 08-190586 7/1996
JP A-9-225787 9/1997
JP A-09-277142 10/1997
JP A-11-301540 11/1999
JP 11-312197 A * 11/1999
JP A-11-312197 11/1999

OTHER PUBLICATIONS

Goldman R. P. et al., "A Constraint–Based Scheduler for Batch Manufacturing" IEEE expert, IEEE Inc., New York, US. vol. 12, No. 1, 1997, pp. 49–56, XP000689724.
Sen B. et al., "Automating the Supplier–Manufacturer Interface with an Electronic Kanban" International Journal of Systems Automation: Research and Application, Norwood, NJ, US, vol. 2, No. 3, 1992, pp. 305–315, XP008011685.

* cited by examiner

*Primary Examiner*—Zoila Cabrera
(74) *Attorney, Agent, or Firm*—Oliff & Berridge, PLC

(57) ABSTRACT

A virtual production line indicating an object (e.g., a vehicle) sequence for an actual production line and objects (e.g., vehicles) planned in the future is updated based on a long-term production plan, a fixed production plan, and actual production results. Then, the ordering timings for the parts necessary for the respective objects in the virtual production line are calculated based on the timing for using the parts and the delivery lead time, and the orders are placed according to those timings.

3 Claims, 3 Drawing Sheets

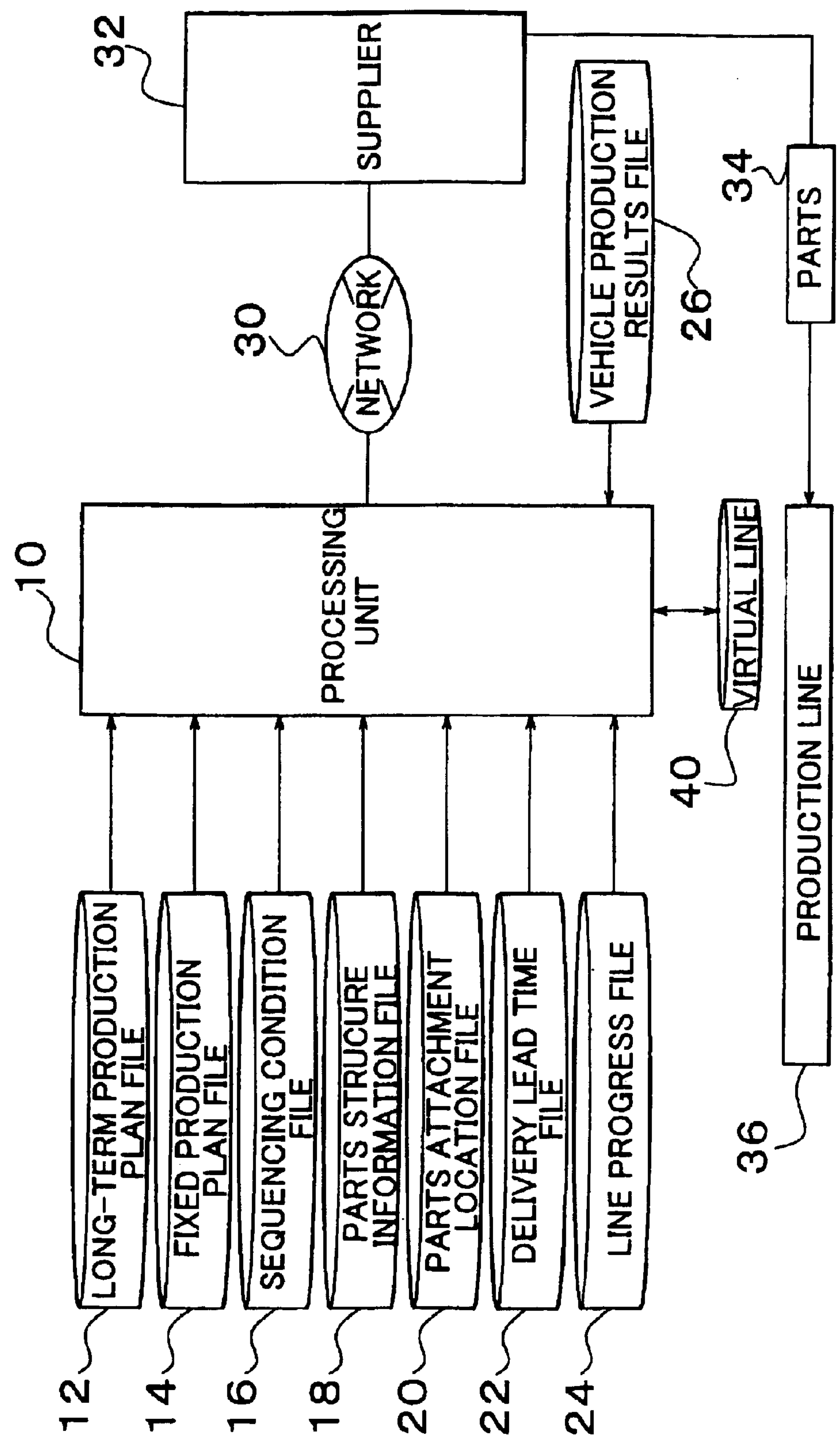
F I G. 1
10
PROCESSING UNIT
12
LONG-TERM PRODUCTION PLAN FILE
14
FIXED PRODUCTION PLAN FILE
16
SEQUENCING CONDITION FILE
18
PARTS STRUCURE INFORMATION FILE
20
PARTS ATTACHMENT LOCATION FILE
22
DELIVERY LEAD TIME FILE
24
LINE PROGRESS FILE
26
VEHICLE PRODUCTION RESULTS FILE
30
NETWORK
32
SUPPLIER
34
PARTS
36
PRODUCTION LINE
40
VIRTUAL LINE

PARTS PROCUREMENT SYSTEM AND METHOD

INCORPORATION BY REFERENCE

The disclosure of Japanese Patent Application No. 2000-220579 filed on Jul. 21, 2000, including the specification, drawings and abstract is incorporated herein by reference in its entirety.

BACKGROUND OF THE INVENTION

1. Field of Invention

The invention relates to a parts procurement system and method that allows a parts order required to manufacture objects (e.g., vehicles) manufactured on a production line to be made at the appropriate time.

2. Description of Related Art

It has conventionally been necessary to properly procure parts during the course of assembly for products such as automobiles and other vehicles that are composed of many parts. Accordingly, various proposals are being made so as to allow ordering of parts at proper times in accordance with the production plan.

For example, Japanese Patent Application Laid-Open No. 8-190586 proposes a parts procurement system in which judgment as to when to make a parts order is made based on when the parts are used, lead time necessary for the delivery of parts from the time an order is placed, the number of parts used, and the like, and selecting an appropriate ordering method thereby.

The parts ordering methods include a replenishment method in which orders are placed to replenish the parts that have been used, a production stage ordering method in which orders are placed at an actual production stage, and a production planning stage ordering method in which orders are placed when a production plan is fixed.

By adopting these ordering methods as appropriate, parts are ordered at appropriate times, thereby preventing a shortage of parts and enabling the number of stocked parts to be decreased.

However, the above-mentioned technique is built on an assumption that the lead time for parts delivery is relatively short, and therefore does not deal with cases with long delivery lead times. That is, there are no methods provided which cover those parts that cannot be delivered in time if the order is placed after the production plan is fixed. In the case of such parts with long delivery lead times, usually a long-term plan is made before the production plan is fixed so as to make orders based on that long-term plan. However, there are many cases where the actual production is not carried out as planned by the long-term plan, resulting in a shortage of parts or unnecessary stock of parts.

SUMMARY OF THE INVENTION

It is an object of the invention to provide a parts procurement system and method that allows proper parts procurement even for those parts with long delivery lead times.

A parts procurement system and method according to one aspect of the invention prepares a virtual production line in which products manufactured thereon are virtually placed in sequence based on a long-term production plan data covering variable production of the objects and a fixed production plan data covering fixed production of the objects. This aspect of the invention then determines the parts and the number thereof necessary for manufacturing the production objects on the virtual production line as well as calculates the parts ordering timing based on a production timing of the objects and parts delivery lead time, and places orders thereby.

Thus, the virtual production line is prepared based on the production plan including the long-term plan. Accordingly, parts for products such as, for example, vehicles in the virtual production line that are in the planning stage can be ordered if necessary. In particular, since this system allows parts to be ordered based on unfixed production plans, those cases with long delivery lead times can be reliably handled.

Further, it is preferred that the system and method be able to correct the prepared virtual production line by taking into consideration the actual production results of the objects, and that the parts be ordered by calculating the parts ordering timing based on the corrected virtual production line.

By changing the virtual production line data according to the actual production results, the virtual production line can be maintained in conformance with the actual production line, allowing the appropriate ordering of parts thereby.

Further, it is preferable to correct the virtual production line by correcting at least one parameter out of a production sequence change, a design change of the object, a production progress, a parts procurement lead time and the like. By taking into consideration such parameters, the virtual production line can be maintained in a state that reflects the actual production more accurately, allowing appropriate parts orders to be placed thereby.

BRIEF DESCRIPTION OF THE DRAWINGS

The foregoing and further objects, features and advantages of the invention will become apparent from the following description of preferred embodiments with reference to the accompanying drawings, in which like numerals are used to represent like elements and wherein:

FIG. 1 is an illustration of a system configuration of one embodiment of the invention;

DETAILED DESCRIPTION OF PREFERRED THE EMBODIMENTS

Figure 2:
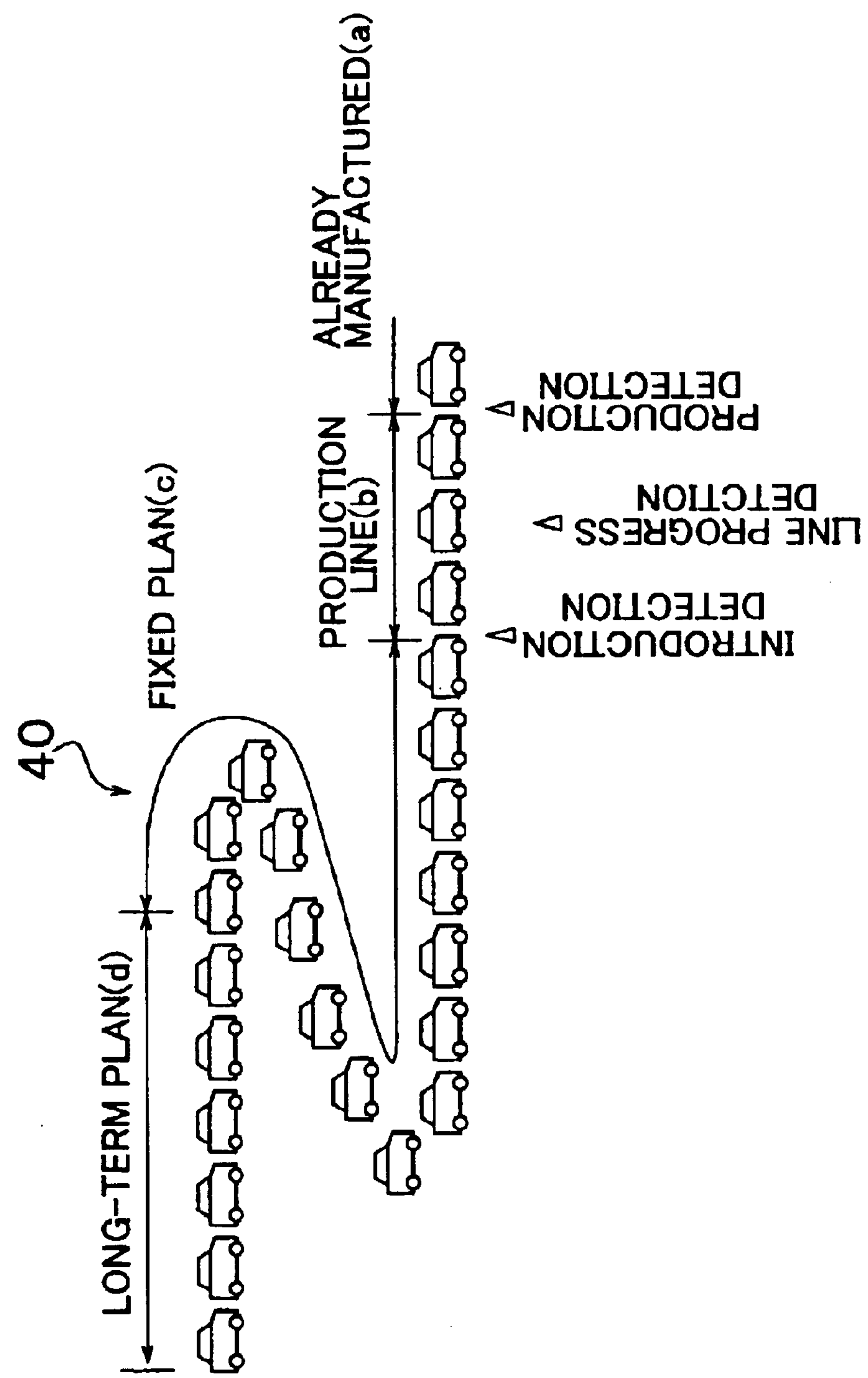
FIG. 2 is an illustration of a virtual production line.

Hereinafter, an embodiment of the invention will be described with reference to the drawings.

One embodiment of the parts procurement system applied to an automobile plant will be described. FIG. 1 illustrates the entire configuration of the system, wherein a long-term production plan file 12, a fixed production plan file 14, a sequencing condition file 16, a parts structure information file 18, a parts attachment location file 20, a delivery lead time file 22, a line progress file 24, and a vehicle production results file 26 are connected to a processing unit 10.

The long-term production plan file 12 is a file for storing a daily production plan for vehicles based on a long-term production plan which is a production plan yet to be fixed (i.e., it is subject to variation). For example, in this file, a production plan of a vehicle for the next three months is stored, and it is updated so as to store a detail production plan for at least one month ahead. The fixed production plan file 14 is for storing a daily production plan based on a fixed production plan, and it stores, for example, plans for 8 to 13 days ahead and is updated every week. Alternatively, the file stores plans for 5 days ahead and is updated every day. Other time frames also are possible. A vehicle sequence prior to the introduction thereof into a production line is set based on these files.

The sequencing condition file 16 is a file for storing level production conditions regarding what vehicle sequence to adopt in introducing the vehicles into the production line upon actually manufacturing the vehicles. The vehicle sequence is corrected based on this file. The parts structure information file 18 is for storing data of parts necessary for the respective vehicle models, and the parts necessary for the respective vehicles are identified based on this file. The parts structure information file 18 is changed in accordance with design changes of the vehicles or the like. The parts attachment location file 20 stores data concerning the attachment location of the respective parts, and the timing at which the respective parts are used on the production line is determined based on this data. The parts attachment location file 20 also is changed according to design changes or the like. The delivery lead time file 22 stores data on the time it takes from the time an order is placed until delivery. Contents thereof are changed in accordance with the changes made by the suppliers. The ordering timing is adjusted according to this file. The line progress file 24 stores data on the progress of the actual production line. Contents thereof are changed in accordance with the line progress. Also, the ordering timing is adjusted according to the content of the line progress file 24. The vehicle production results file 26 stores data on vehicles actually obtained from the production line, and it allows checking of whether or not the production has been carried out on the production line as planned. If the actual production results are different from the plan, the production plan is changed accordingly, and the vehicle sequence is changed.

The processing unit 10 constructs a virtual line 40 based on the contents of the above-mentioned long-term production plan file 12, the fixed production plan file 14, the sequencing condition file 16, the parts structure information file 18, the parts attachment location file 20, the delivery lead time file 22, the line progress file 24, and the vehicle production results file 26.

The virtual line 40 is not only constructed for the actual production line, but is also constructed for the production plan as a vehicle sequence, and contains data on which parts are needed at what time for the respective vehicles. Moreover, the ordering timing may also be calculated by referring to the delivery lead time file 22. Accordingly, the processing unit 10 determines the parts that need to be ordered that day based on the vehicle sequence in the virtual line 40 so as to place orders for those parts.

A supplier 32 (usually a plurality of suppliers according to the parts) is connected to the processing unit 10 via a network 30. The processing unit 10 places orders for the respective parts on-line in accordance with the ordering timing that has been determined. The network 30 may be a communication line using, e.g., the Internet, or it may be a dedicated line. Communication between the processing unit 10 and the supplier 32 can be made by means such as radio-waves, via satellite, cellular communication, etc.

The supplier 32 prepares the ordered parts at a specified time, and supplies those parts 34 to a production line 36 of a plant. On the production line 36, automobiles are manufactured using the supplied parts.

The line progress and the production results of the production line 36 are measured so as to use such information in updating the line progress file 24 and the vehicle production results file 26. Accordingly, the virtual line 40 is corrected in accordance with the actual state so the virtual line 40 is always maintained in a proper state. Consequently, it is possible to order parts appropriately using the virtual line 40 data.

FIG. 2 illustrates the virtual line 40 used in this embodiment. As seen from this figure, in the virtual line, not only the actual production line but also the production plan obtained from the long-term plan are considered in assuming a production line that basically covers all timings at which parts orders are to be made so as to prepare a virtual sequence of vehicles to be manufactured. The virtual line has a vehicle sequence regarding the vehicle production results for vehicles that have already completed production (a), a vehicle sequence on the production line actually being manufactured (b), a vehicle sequence based on the fixed production plan (c), and a vehicle sequence based on the long-term plan (d), arranged in a manner similar to an actual production line.

In this embodiment, as described above, parts orders are placed after determining whether or not daily parts ordering is necessary for each vehicle in the virtual line 40.

Figure 3:
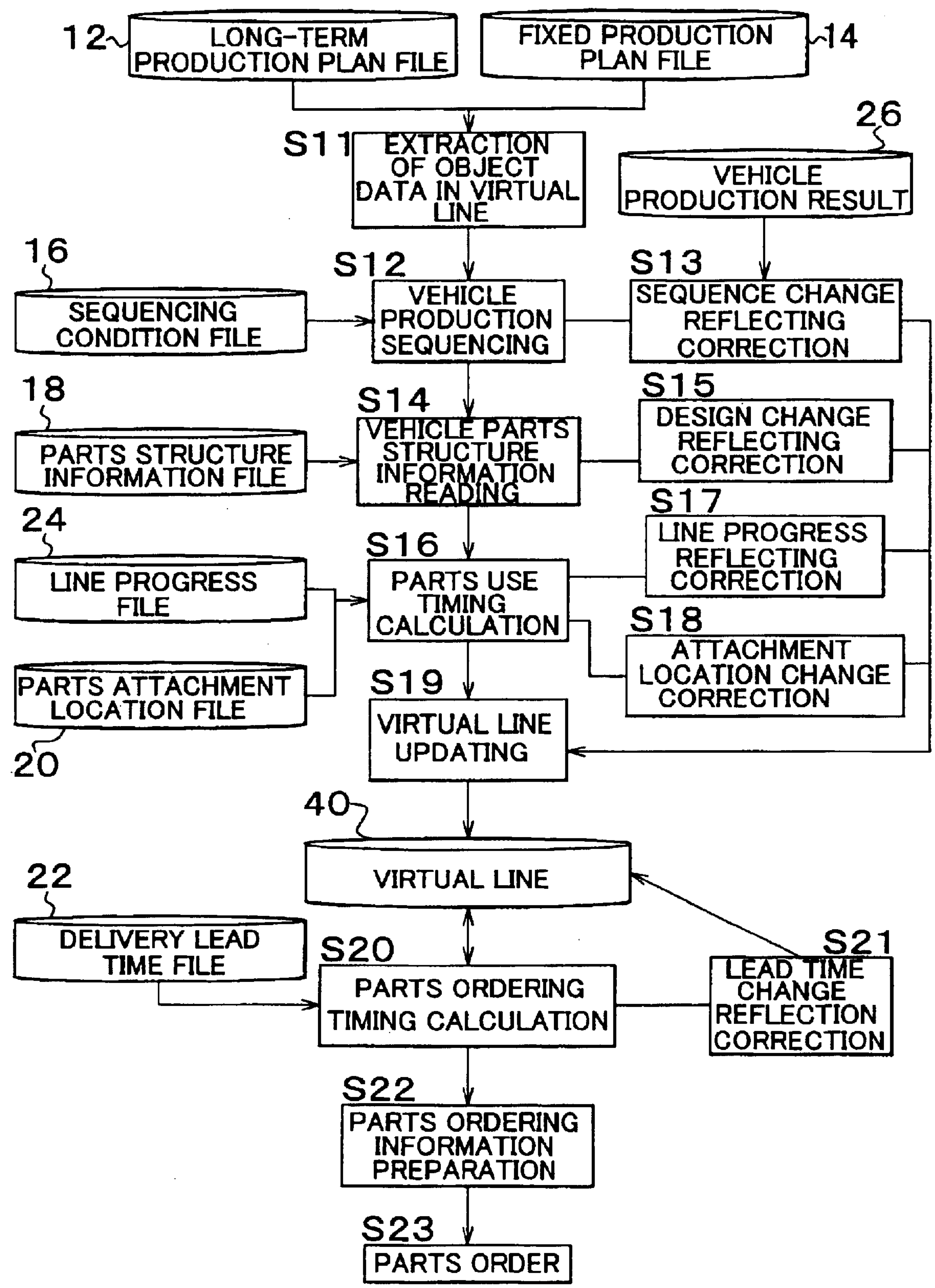
FIG. 3 is a flowchart showing ordering operations.

This operation will be described with reference to FIG. 3. First, data that needs to be updated in the virtual line 40 is extracted from the long-term production plan file 12 and the fixed production plan file 14 (S11). The processing in S11 is executed, for example, once a day so as to extract the data from the respective files 12 and 14 that needs to be added to the virtual line 40.

For example, if the virtual line 40 contains a vehicle sequence up to 15 days ahead from the present date, a fifteenth day vehicle production plan is extracted from the long-term production plan file 12 every day. On the other hand, data that has been updated is extracted from the fixed production plan file 14 when this file has been updated.

A vehicle sequence period covered by the virtual line 40 should be such that almost all necessary parts are available in relation to the delivery lead times of the respective parts. Therefore, it may be longer or shorter than 15 days depending on the plant. Further, in the case where there are special parts that are very small in quantity with long delivery lead times, it is preferable that the orders be made separately.

After the data necessary for updating the virtual line 40 is incorporated, vehicle production sequencing processing is performed (S12). For this purpose, sequencing conditions are read out from the sequencing condition file 16 and the production sequence of the vehicles is determined based on the sequencing conditions. In extraction of the data for the virtual line in S11, the vehicle production sequencing using the long-term production plan file 12 is basically an addition of sequencing data for one day, while extraction of the data from the fixed production plan file 14 means changing of the vehicle sequence that had been set by the long-term production plan.

In S12, if changes occur in the sequence of the vehicle sequence that has already been set, processing for reflecting that change is executed based on that data (S13). Here, the vehicle sequence needs to be changed also in a case where production was not carried out in the actual production line as planned. Accordingly, in a sequence change reflecting correction processing in S13, reference is made to the data in the vehicle production results file 26 so as to carry out the sequence change processing.

When data concerning the vehicle sequence obtained in S12 is obtained, a parts structure is read from the parts structure information file 18 for each vehicle based on this data (S14). That is, the parts structure information file 18 contains data on parts used for constructing the respective vehicles that are manufactured. Therefore, the parts structure for the vehicle to be added to the virtual line 40 is obtained. Further, if a design change is carried out for a vehicle, the parts structure information of the corresponding vehicle is changed. In this case, processing for reflecting the design change on the respective parts on the virtual line is executed (S15).

When data concerning parts used in the respective vehicles is obtained in S14, the timings for using these parts are calculated (S16). The timings for using the parts can be calculated based on the plan as long as the actual production line is run in accordance with the plan. However, if the actual production is different from the plan, the timing for using the parts changes. Since the progress of the line is stored in the line progress file 24 updated as appropriate, the content of the line progress file 24 is used in calculating when the parts are used. Further, there are cases where a parts attachment location in a vehicle is changed. In such cases also, the timings for using the parts may change. Since the parts attachment locations for the respective vehicles are stored in the parts attachment location file 20, the timings for using the parts are calculated using this data also. If the line progress is not as planned, the transfer state of the vehicle sequence needs to be changed and the timing for using the parts needs to be corrected for the virtual line 40. Therefore, processing for reflecting a change in the line progress is executed (S17). If the attachment location is changed, processing for changing the timing for using the parts is executed according to the location change even for the vehicles in the virtual line 40 (S18).

In this way, if the timings for using the parts are calculated in S16, the virtual line 40 is updated based on the additional vehicle data including the timing for using each part (S19). Further, the virtual line 40 is corrected based on data concerning the sequence change reflecting correction in S13, the design change reflecting correction in S15, the line progression reflecting correction in S17, and the attachment location change correction in S18.

As described above, the virtual line 40 is updated based on the plan and the actual state so as to be maintained in a correct state.

Then, the parts are ordered using the data on the virtual line 40. To this end, the timings for using the respective parts in the virtual line 40 are read out from the corresponding data, and the timings for ordering each part are calculated based on the delivery lead time data read from the delivery lead time file 22 (S20). The content of the delivery lead time file 22 may change depending on delivery lead time improvements (or slow downs) made by the supplier. In this case, processing for reflecting the lead time change on the virtual line 40 is executed (S21). Then, the virtual line 40 is changed according to this result.

If the calculation of the parts ordering timing has been completed in S20, parts ordering information for that day is prepared (S22) and is transmitted to place an order (S23). Further, this ordering information is also stored in the virtual line 40 for the respective vehicles and parts, while the size of the order for each supplier is stored in an ordering information file (not shown).

Depending on the calculation processing results of the parts order timing in S20, sometimes the parts are not delivered in time. In such cases, an alarm is output and the situation may be dealt with by an express order.

Moreover, there are cases where corrections need to be made for the parts that have already been ordered as a result of updating of the virtual line 40. In such cases, an appropriate correction of the order is made.

According to this embodiment of the invention, a virtual line 40 is prepared for the vehicle sequence of the production line based on the production plan including the long-term plan and the actual results. Consequently, orders for necessary parts for the vehicles in the virtual line 40 in the planning stage can also be made. In particular, since the parts orders can be made using unfixed (variable) production plans, cases with long delivery lead times can be handled reliably.

In the illustrated embodiment, a controller (the processing unit 10) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A parts procurement system comprising:

virtual production line preparation means for preparing a virtual production line in which objects manufactured thereon are virtually placed in sequence based on long-term production plan data that is more than one month covering variable production of the objects and fixed production plan data covering fixed production of the objects;

parts ordering means for determining parts and the number of the parts necessary for manufacturing the objects on the virtual production line prepared by the virtual production line preparation means, as well as calculating the parts ordering timing based on a production timing of the objects and parts delivery lead time; and correction means for correcting the virtual production line prepared by the virtual production line preparation means according to actual production results of the objects, wherein the parts ordering means places a parts order after calculating the parts ordering timing based on the corrected virtual production line;

wherein the correction means changes the virtual production line by detecting a production progress; and wherein detecting the production progress includes detecting objects that have completed production from the production line.

2. A parts procurement system comprising a controller that:

prepares a virtual production line in which objects manufactured thereon are virtually placed in sequence based on long-term production plan data that is more than one month covering variable production of the objects and fixed production plan data covering fixed production of the objects;

determines parts and the number of the parts necessary for manufacturing the objects on the prepared virtual production line, and calculates the parts ordering timing based on a production timing of the objects and parts delivery lead time; and corrects the prepared virtual production line according to actual production results of the objects, and places a parts order after calculating the parts ordering timing based on the corrected virtual production line;

wherein the controller changes the prepared virtual production line by detecting parameter of a production progress; and wherein detecting the production progress includes detecting objects that have completed production from the production line.

3. A method of procuring parts, comprising:

preparing a virtual production line in which objects manufactured thereon are virtually placed in sequence based on long-term production plan data that is more than one month covering variable production of the objects and fixed production plan data covering fixed production of the objects;

determining parts and the number of the parts necessary for manufacturing the objects on the prepared virtual production line;

calculating the parts ordering timing based on a production timing of the objects and parts delivery lead time;

correcting the prepared virtual production line according to actual production results of the objects; and placing a parts order after calculating the parts ordering timing based on the corrected virtual production line;

wherein the prepared virtual production line is changed by detecting of a production progress; and wherein detecting the production progress includes detecting objects that have completed production from the production line.

* * * * *